Feb. 8, 1966  A. H. MÜLLER ETAL  3,233,707
AIR-COOLED DRUM TYPE BRAKE
Filed April 6, 1964
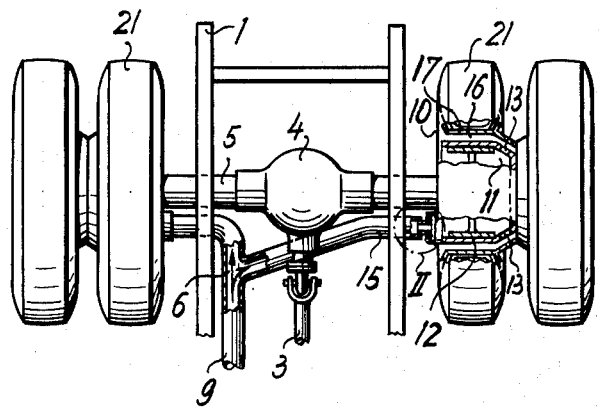
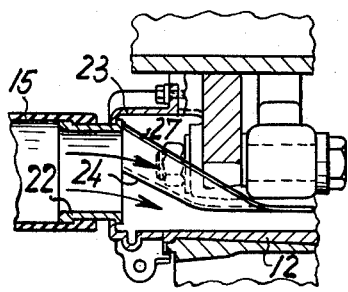
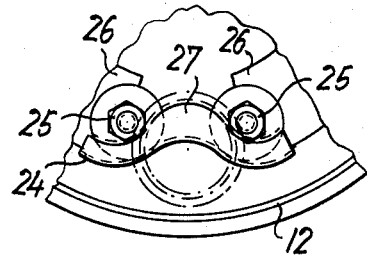
INVENTORS
ALFRED H. MÜLLER
FRIEDRICH RÜCKERT
BY Dicke and Craig
ATTORNEYS

United States Patent Office 3,233,707
Patented Feb. 8, 1966

3,233,707
AIR-COOLED, DRUM TYPE BRAKE
Alfred H. Müller and Friedrich Rückert, Waiblingen, Germany, assignors to Daimler-Benz Aktiengesellschaft, Unterturkheim, Germany
Filed Apr. 6, 1964, Ser. No. 357,833
6 Claims. (Cl. 188—264)

The present invention relates to improvements in air-cooled brakes which for a prolonged actuation are connected to a blower for passing cooling air into the brake drum at a point near the wheel axle.

It is an object of the invention to pass the cooling air into the brake drum at a point in front of the pivots of the brake shoes and to provide deflecting means between the air inlet opening and these pivots for guiding the air current so as not to impinge upon the pivots but directly upon the inner peripheral surface of the brake drum.

A further object of the invention is to provide guide means for conducting the cooling air so as to impinge upon the brake drum in the form of a solid jet at a point where the greatest possible cooling effect will be attained, and for preventing the effect of the current of cooling air entering into the brake drum from being dissipated by turbulence.

Since according to the invention the air current passes into the brake drum underneath the brake shoe pivots and then covers the entire width of the drum, the entire peripheral surface of the rotating drum will be effectively cooled at the point of impact of the air current.

These and other objects, features, and advantages of the present invention will become further apparent from the following detailed description thereof which is to be read with reference to the accompanying sheet of drawings in which:

FIGURE 1 shows a plan view, partly in section, of the rear part of the chassis of a truck which is provided with air-cooled brakes;

FIGURE 2 shows an enlarged cross section of the part which is enclosed in FIGURE 1 by the dotted circular line II; while FIGURE 3 shows an end view of the air deflector plate according to FIGURE 2 which guides the air current past the brake shoe pivots.

FIGURE 1 illustrates the rear end of the chassis frame 1 of a truck, the front engine unit of which drives the rear axles 5 by means of a universal shaft 3 and the differential gear which is mounted in the casing 4. A blower, not shown, which may be mounted on the chassis frame and be driven by a clutch which may be engaged and disengaged either independently or in accordance with the position of a hand-brake lever or foot-brake lever or of an exhaust-brake lever, is connected by a pressure line 9, a branch piece 6 in front of the rear axle 5, and the two branch lines 15 to the brake drums 12 of the rear-wheel brakes 10. The inside 11 of each brake is connected by air ducts 13 with an annular chamber 16 which is interposed between the brake drum 12 and the rim 17 of the respective wheel 21. As also shown in FIGURE 1, the end of each branch pressure line 15 is located on the inner side of the brake adjacent to the axle 5.

As illustrated more clearly in FIGURE 2, each branch pressure line 15 consists of a flexible pressure hose, the end of which is connected to a socket 22 which, in turn, is connected to an insert 23 which is removably secured, for example, by bolts, on the brake drum support. Either from the socket 22 or from the insert 23 an air deflector plate 24 projects in such a manner into the arcuate area substantially paralleling the brake shoes 26 and limited at its ends by the pivots 25, 25 of the brake shoes (FIGURE 3) that the central semicylindrical or inwardly slightly conical section 27 of this deflector plate 24 forms an air guide channel which, as shown in FIGURE 2, is inclined to the brake drum.

The arrows in FIGURE 2 indicate that the air which passes from the pressure hose 15 into the brake drum is deflected by the deflector plate 24, 27 into the area between the pivots 25, 25 of the brake shoes and away from these pivots and that it then impinges as a solid jet upon the particular drum section which is traveling past this point. Consequently, this drum section will be cooled very effectively. From its point of entry, the air is then partly taken along in the peripheral direction of the brake drum, while another part passes directly into the chamber 11 behind the brake shoes from wihch it flows through the air ducts 13 into the annular chamber 16 between the brake drum 12 and the rim 17. In this annular chamber 16 annular plates may be provided for shielding the rim 17 and thus also the tires from the emerging hot air. In addition, it is also possible to provide cooling ribs and/or impeller blades in the annular chamber 16 for increasing the effective cooling surface and/or for expelling the air more quickly. These cooling ribs and blades preferably extend only up to an outer annular plate and not up to the wheel rim so as to prevent the heat from flowing past these ribs and blades to the rim.

It may further be seen in FIGURE 1 that by the means according to the invention the direction of flow of the current of cooling air is reversed completely about an angle of 180° between its point of entry into the brake drum 12 and its point of discharge from the annular chamber 16. This results in a long current path within a very small area and thus in a very good cooling effect.

Although our invention has been illustrated and described with reference to the preferred embodiment thereof, we wish to have it understood that it is in no way limited to the details of such embodiment, but is capable of numerous modifications within the scope of the appended claims.

Having thus fully disclosed our invention, what we claim is:

1. In a vehicle having axles and wheels thereon, brakes for said wheels each comprising a brake drum on one of said axles and brake shoes pivotably mounted on pivot members in fixed positions in said drum, said pivot members defining the end limits of an arcuate area, and a blower for passing cooling air into said brake drum, the improvement comprising a pressure line adapted to convey cooling air from said blower to said brake drum, supporting means for said pressure line adjacent said drum and said one of said axles, and an air deflecting plate disposed within said drum between said supporting means and said pivot members of said brake shoes for guiding the air entering said brake drum, said air deflecting plate comprising means effective to prevent impingement of said air upon said pivot members and to direct a stream of air upon the inner peripheral surface of said brake drum.

2. A device as defined in claim 1, in which said deflecting plate forms a substantially semicylindrical air guide channel projecting into said arcuate area.

3. A device as defined in claim 1, in which said deflecting plate forms a conically tapered air guide channel projecting from said supporting means through said arcuate area.

4. A device as defined in claim 1, in which said deflecting plate forms an air guide channel projecting through said arcuate area, said plate being inclined toward the inner peripheral surface of said brake drum.

5. A device as defined in claim 1, wherein the outer periphery of said brake drum is spaced from the inner periphery of said wheel to form therebetween an annular chamber, and additional means in said annular chamber for increasing the cooling surface of said drum.

6. A device as defined in claim 1, wherein the outer periphery of said brake drum and the inner periphery of said wheel are spaced from each other and thereby form an annular chamber, and impeller blades in said annular chamber for expelling heated air from said drum.

References Cited by the Examiner

UNITED STATES PATENTS

| | | | |
|---|---|---|---|
| 1,828,972 | 10/1931 | La Brie | 188—264 |
| 1,905,657 | 4/1933 | Tarbox | 188—264 |
| 2,105,176 | 1/1938 | Ash | 188—264 |

FOREIGN PATENTS

| | | |
|---|---|---|
| 7,862/27 | 6/1927 | Australia. |
| 1,221,780 | 1/1960 | France. |

MILTON BUCHLER, *Primary Examiner.*

ARTHUR L. LA POINT, *Examiner.*